US010974230B2

(12) United States Patent
Viswanathan

(10) Patent No.: US 10,974,230 B2
(45) Date of Patent: Apr. 13, 2021

(54) DOPED-CARBON COMPOSITES, SYNTHESIZING METHODS AND APPLICATIONS OF THE SAME

(71) Applicant: BOARD OF TRUSTEES OF THE UNIVERSITY OF ARKANSAS, Little Rock, AR (US)

(72) Inventor: Tito Viswanathan, Little Rock, AR (US)

(73) Assignee: BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 0 days.

(21) Appl. No.: 16/380,174

(22) Filed: Apr. 10, 2019

(65) Prior Publication Data
US 2019/0247834 A1   Aug. 15, 2019

Related U.S. Application Data

(60) Division of application No. 15/474,281, filed on Mar. 30, 2017, now Pat. No. 10,293,329, which is a division of application No. 13/767,076, filed on Feb. 14, 2013, now Pat. No. 9,643,165, and a continuation-in-part of application No. 13/335,418, filed on Dec. 22, 2011, now Pat. No. 8,574,337, and a continuation-in-part of application No. 13/069,097, filed on Mar. 22, 2011, now Pat. No. 8,790,615, and a continuation-in-part of application No. 12/487,174, filed on Jun. 18, 2009, now Pat. No. 8,167,973, and a continuation-in-part of application No. 12/487,323, filed on Jun. 18, 2009, now abandoned.

(60) Provisional application No. 61/598,397, filed on Feb. 14, 2012, provisional application No. 61/316,669, filed on Mar. 23, 2010, provisional application No. 61/132,380, filed on Jun. 18, 2008.

(51) Int. Cl.
B01J 27/24       (2006.01)
H01B 1/04        (2006.01)
H01M 4/583       (2010.01)
C01B 32/05       (2017.01)
B01J 21/18       (2006.01)
B01J 27/14       (2006.01)
B01J 35/00       (2006.01)
B01J 37/08       (2006.01)
B01J 37/34       (2006.01)
C02F 1/72        (2006.01)
C02F 1/30        (2006.01)
B01J 37/02       (2006.01)
C25B 1/55        (2021.01)
C02F 101/30      (2006.01)
H01M 4/96        (2006.01)

(52) U.S. Cl.
CPC ............... *B01J 27/24* (2013.01); *B01J 21/18* (2013.01); *B01J 27/14* (2013.01); *B01J 35/004* (2013.01); *B01J 37/0236* (2013.01); *B01J 37/084* (2013.01); *B01J 37/346* (2013.01); *C01B 32/05* (2017.08); *C02F 1/30* (2013.01); *C02F 1/725* (2013.01); *C25B 1/55* (2021.01); *H01B 1/04* (2013.01); *B01J 35/0033* (2013.01); *C01P 2002/82* (2013.01); *C02F 2101/30* (2013.01); *C02F 2305/10* (2013.01); *H01M 4/583* (2013.01); *H01M 4/96* (2013.01)

(58) Field of Classification Search
CPC ..... C01B 31/0273; C01B 31/02; C01B 31/05; C01B 31/10; H01B 1/04; B01J 27/16; B01J 27/24
USPC .......................................... 252/502, 510, 511
See application file for complete search history.

(56) References Cited

U.S. PATENT DOCUMENTS

| 5,358,802 A * | 10/1994 | Mayer ................ C04B 38/0022 252/502 |
| 2002/0106514 A1* | 8/2002 | Lafdi ...................... C04B 35/83 428/408 |
| 2008/0017832 A1* | 1/2008 | Funaoka .................. C08L 79/00 252/500 |
| 2010/0059706 A1* | 3/2010 | Dai ........................ H01M 4/136 252/182.1 |
| 2011/0136014 A1* | 6/2011 | Kay ...................... C04B 35/447 429/231.8 |
| 2012/0282527 A1* | 11/2012 | Amine .................. C23C 16/403 429/231.8 |
| 2014/0322608 A1* | 10/2014 | Claussen ............... H01M 4/587 429/224 |

FOREIGN PATENT DOCUMENTS

CN         1911792 A  *  2/2007  ............. C01B 25/45

OTHER PUBLICATIONS

Lin "Facile preparation of nitrogen-doped graphene as a metal-free catalyst for oxygen reduction reaction." Phys. Chem. Chem. Phys., 2012, 14, 3381-3387 (Year: 2012).*
Puziy "XPS and NMR studies of phosphoric acid activated carbons." Carbon, 46, pp. 2113-2123, online Sep. 11, 2008 (Year: 2008).*

(Continued)

*Primary Examiner* — Tri V Nguyen
(74) *Attorney, Agent, or Firm* — Locke Lord LLP; Tim Tingkang Xia, Esq.

(57) ABSTRACT

A composite synthesized by the steps of preparing a solution having a carbon source material and a heteroatom containing additive; evaporating the solution to yield a plurality of powders; and subjecting the plurality of powders to a heat treatment for a duration of time effective to produce a doped carbon composite.

7 Claims, 11 Drawing Sheets

(56) References Cited

OTHER PUBLICATIONS

Wu "Carbon anode materials based on melamine resin" J. Mater. Chem., 1998, 8(10), 2223-2227 (Year: 1998).*
Hulicova "Supercapacitors Prepared from Melamine-Based Carbon." Chem. Mater. 2005, 17, 1241-1247 (Year: 2005).*

* cited by examiner

DOPED-CARBON COMPOSITES, SYNTHESIZING METHODS AND APPLICATIONS OF THE SAME

CROSS-REFERENCE TO RELATED PATENT APPLICATIONS

This application is a divisional application of U.S. patent application Ser. No. 15/474,281, filed Mar. 30, 2017, now allowed, which itself is a divisional application of U.S. patent application Ser. No. 13/767,076, filed Feb. 14, 2013, now issued U.S. Pat. No. 9,643,165, which claims priority to and the benefit of U.S. Provisional Patent Application Ser. No. 61/598,397, filed Feb. 14, 2012; and is a continuation-in-part application of U.S. patent application Ser. No. 13/335,418, filed Dec. 22, 2011, now issued U.S. Pat. No. 8,574,337, which itself claims priority to and the benefit of U.S. Provisional Patent Application Ser. No. 61/316,669, filed Mar. 23, 2010; and is also a continuation-in-part application of U.S. patent application Ser. No. 13/069,097, filed Mar. 22, 2011, now issued U.S. Pat. No. 8,790,615, which itself claims priority to and the benefit of U.S. Provisional Patent Application Ser. No. 61/316,669, filed Mar. 23, 2010; and is also a continuation-in-part application of U.S. patent application Ser. No. 12/487,174, filed Jun. 18, 2009, now issued U.S. Pat. No. 8,167,973, which itself claims priority to and the benefit of U.S. Provisional Patent Application Ser. No. 61/132,380, filed Jun. 18, 2008; and is also a continuation-in-part application of U.S. patent application Ser. No. 12/487,323, filed Jun. 18, 2009, now abandoned, which claims priority to and the benefit of U.S. Provisional Patent Application Ser. No. 61/132,380, filed Jun. 18, 2008.

All of the above-identified applications are incorporated herein by reference in their entireties.

Some references, which may include patents, patent applications, and various publications, are cited and discussed in the description of this invention. The citation and/or discussion of such references is provided merely to clarify the description of the invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [1] represents the 1st reference cited in the reference list, namely, Non-covalent doping of graphitic carbon nitride with graphene: controlled electronic structure and enhanced optoelectronic conversion by Y. Zhang, T. Mori, L. Niu and J. Ye, Energy Environ. Sci. 2011, 4, 4517.

STATEMENT AS TO RIGHTS UNDER FEDERALLY-SPONSORED RESEARCH

This invention was made with government support under DE-FG36-06G086072 awarded by the Department of Energy. The government has certain rights in the invention.

FIELD OF THE INVENTION

The invention generally relates to carbon materials, and more particularly, to doped carbon composites, synthesizing methods and applications of the same.

BACKGROUND OF THE INVENTION

Traditionally, the materials that have been used in photocatalysis have been metal containing, where the metal includes one or more transition metals including copper, platinum, indium, gallium, arsenic etc. and suffer drawbacks such as metal instability in different oxidation states, cost, toxicity and difficulty associated with the manufacture of these materials. Recent work in Germany and China by Antonetti and co-workers [1] shows that metal-free polycarbon nitride can be used in photocatalytic reaction mentioned above due to the favorable band gap associated with optical absorption, a value which is about 2.7 eV and is strategically placed in an energy scale that is efficient in degradation of organic molecules under visible light. However, the efficiency with which the degradation takes place is low and not practical due to the very low amount of light absorbed above 420 nm. Since most of the visible spectrum lies above that value (up to 800 nm) the quantum yield and efficiency of the catalytic process is very low.

It would be desirable to shift the onset of visible light absorption to higher values so that more of the visible light is absorbed which may translate to a more efficient photocatalysis for organic molecule degradation as well as photocatalytic splitting of water. Besides the band gap the positions of the valence band and the conduction band is important. The band gap required for splitting water is greater than 1.23 eV (less than 1000 nm). However in case of visible light a band gap of less than 3.0 eV (greater than 400 nm) is required. The band gap should be preferably between 2.43 eV and 3.3 eV. Both the reduction and oxidation potential of water should lie within the band gap of the photocatalytic material. The energy of the valence band has to be lower than the oxidation potential of oxygen in order to generate oxygen, while the energy of the conduction band has to be higher than the reduction potential of hydrogen. When light interacts with the surface of the photocatalyst charge separation into excited photons and holes are created which correspond to conduction and valence bands respectively. Recombination of these must be avoided for higher efficiency devices and practical applications. Electron mobility to the surface may be desirable to keep the charges separated.

To achieve the above stated desired properties researchers have incorporated graphite or graphene in the mixture by preparing carbon nitride in the presence of graphite sheets. The procedure involved the preparation of a melamine-graphite immiscible mix which was then heated to a temperature of 550° C. in the presence of nitrogen gas till the melamine molecules condensed to carbon nitride. The product was shown to be a layered structure comprising of carbon nitride and graphene. The composite was shown to be superior than graphitic carbon nitride (i.e., carbon nitride that exists in a 2D form similar to graphite). Thus the composite made of alternating layers of pristine graphitic carbon nitride and pristine graphite exhibited better photocatalytic degradation properties than pristine graphitic carbon nitride alone.

However, the use of pre-made graphite in the above-mentioned process adds more time, cost and complexity because it adds to the steps required preparing the material. Furthermore, the preparation using premade graphite yields a composite consisting of carbon nitride and graphite/graphene that are not covalently linked to each other, which is not desirable.

Therefore, a heretofore unaddressed need exists in the art to address the aforementioned deficiencies and inadequacies.

SUMMARY OF THE INVENTION

Accordingly, among other things, it is desirable to invent a process of preparing a material with the desired catalytic properties such as high visible light absorption, stability and ease of synthesis which is superior to those up to date. It would be preferable to make a material that uses renewable resource material during the course of the synthesis and during which the carbon is a covalently incorporated integral part of the final material. The material should exhibit high efficiency for photocatalytic processes described above. Also the process should be easy, which does not involve the use of inert or other kind of gases during the transformation. Also the process should be quick and not time consuming as the state of the art processes upto now involve.

In one aspect, the invention provides such a novel process for the synthesis of a novel material that can be termed as doped carbon that exhibits unique spectral properties and is different than any reported in the literature so far. The process for the material synthesis, among other things, has the following advantages over the existing technologies: (a) it includes renewable resource materials as carbon source (b) it is very inexpensive, as it uses inexpensive and readily available ingredients; (c) it is quick; (d) it is reproducible; and (e) it does not use any gases from an outside source during the synthesis.

Furthermore, the product made by the process, doped carbon, unlike pure carbon, can impart desirable properties such as increased conductivity, thermal stability and interesting optical properties which could be beneficial in several applications such as traditional catalysis and photocatalysis including photocatalytic degradation of organic molecules in water as well as air. They may also be useful in photocatalytic splitting of water to produce hydrogen and oxygen under the right conditions.

In another aspect of the invention, a method of synthesizing a doped carbon composite includes the steps of preparing a solution having a material containing tannin and an additive containing a doping chemical element; evaporating the solution to yield a plurality of powders; and subjecting the plurality of powders to a heat treatment for a duration of time effective to produce the doped carbon composite.

In one embodiment, the material containing the tannin is tannin sulfonate, lignin, lignosulfonate, or a mixture thereof. The additive containing the doping chemical element is one containing oxygen (O), nitrogen (N), phosphorus (P), boron (B), sulfur (S), iodine (I), fluorine (F), silicon (Si), selenium (Se), germanium (Ge), or a mixture thereof.

In one embodiment, the heat treatment is performed at a temperature in a range of about 700° C. to about 1800° C. The duration of time effective is in a range of about 10 minutes to about 2 hours.

In one embodiment, the heat treatment is performed by subjecting the plurality of powders to a microwave radiation with a frequency of 2.45 GHz.

In another embodiment, the heat treatment is performed by a heat source other than a microwave radiation source.

Furthermore, the method may include the step of adding polyphosphoric acid to the plurality of powders prior to the subjecting step.

In yet another aspect of the invention, a composite synthesized by pyrolysis of a mixture of tannin and melamine, where the steps involved in the synthesis process include dissolving the tannin and the melamine in water to form a homogeneous solution; evaporating the solution to yield a dry solid; and subjecting powders of the dry solid to a heat treatment between about 700° C. and about 1800° C. for about 10 minutes to about 2 hours. Additionally, the synthesis process further may also have the step of adding polyphosphoric acid to the plurality of powders prior to the subjecting step.

In a further aspect of the invention, a method of synthesizing a doped carbon composite includes the steps of preparing a solution having a carbon source material and a heteroatom containing additive; evaporating the solution to yield a plurality of powders; and subjecting the plurality of powders to a heat treatment for a duration of time effective to produce the doped carbon composite.

In one embodiment, the carbon source material comprises tannin, urea, lignin, lignosulfonate, tannin sulfonate, phenol formaldehyde resins, melamine formaldehyde resins, tannin formaldehyde resins, resorcinol formaldehyde resins, urea formaldehyde resins, or a mixture thereof.

In one embodiment, the heteroatom containing additive comprises one containing O, N, P, B, S, I, F, Si, Se, Ge, or a mixture thereof.

In one embodiment, the heat treatment is performed at a temperature in a range of about 700° C. to about 1800° C. In one embodiment, the duration of time effective is in a range of about 10 minutes to about 2 hours.

In one embodiment, the heat treatment is performed by subjecting the plurality of powders to a microwave radiation with a frequency of 2.45 GHz.

In another embodiment, the heat treatment is performed by a heat source other than a microwave radiation source.

In one embodiment, the method also includes the step of adding polyphosphoric acid to the plurality of powders prior to the subjecting step.

In yet a further aspect of the invention, a composite synthesized by the steps of preparing a solution having a carbon source material and a heteroatom containing additive; evaporating the solution to yield a plurality of powders; and subjecting the plurality of powders to a heat treatment for a duration of time effective to produce a doped carbon composite. In one embodiment, the synthesis process further includes the step of adding polyphosphoric acid to the plurality of powders prior to the subjecting step.

In one embodiment, the carbon source material comprises tannin, urea, lignin, lignosulfonate, tannin sulfonate, phenol formaldehyde resins, melamine formaldehyde resins, tannin formaldehyde resins, resorcinol formaldehyde resins, urea formaldehyde resins, or a mixture thereof.

In one embodiment, the heteroatom containing additive comprises a compound containing O, N, P, B, S, I, F, Si, Se, Ge, or a mixture thereof.

In one embodiment, the additive containing the doping chemical element comprises a boron compound containing boric acid, or sodium borate.

In one embodiment, the additive containing the doping chemical element comprises a phosphorus compound containing phosphoric acid, polyphosphoric acid, or sodium phosphate.

In one embodiment, the additive containing the doping chemical element comprises a silicon compound containing potassium silicate.

In one embodiment, the additive containing the doping chemical element comprises a fluorine compound containing ammonium fluoride.

In one embodiment, the additive containing the doping chemical element comprises an iodine compound containing sodium iodide, or ammonium iodide.

In one embodiment, the additive containing the doping chemical element comprises a nitrogen compound containing melamine, dicyandiamide, urea, guanidine, or histidine.

In one embodiment, the additive containing the doping chemical element further comprises hexamine.

The composite is useable for visible light degradation of organic molecules in water.

In one aspect of the invention, an article of manufacture is provided, where the article of manufacture is made according to the method set forth above.

The article of manufacture is a supercapacitor, a fuel cell, photovoltaic cell, a lithium ion battery, an air filter, or a water filter.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
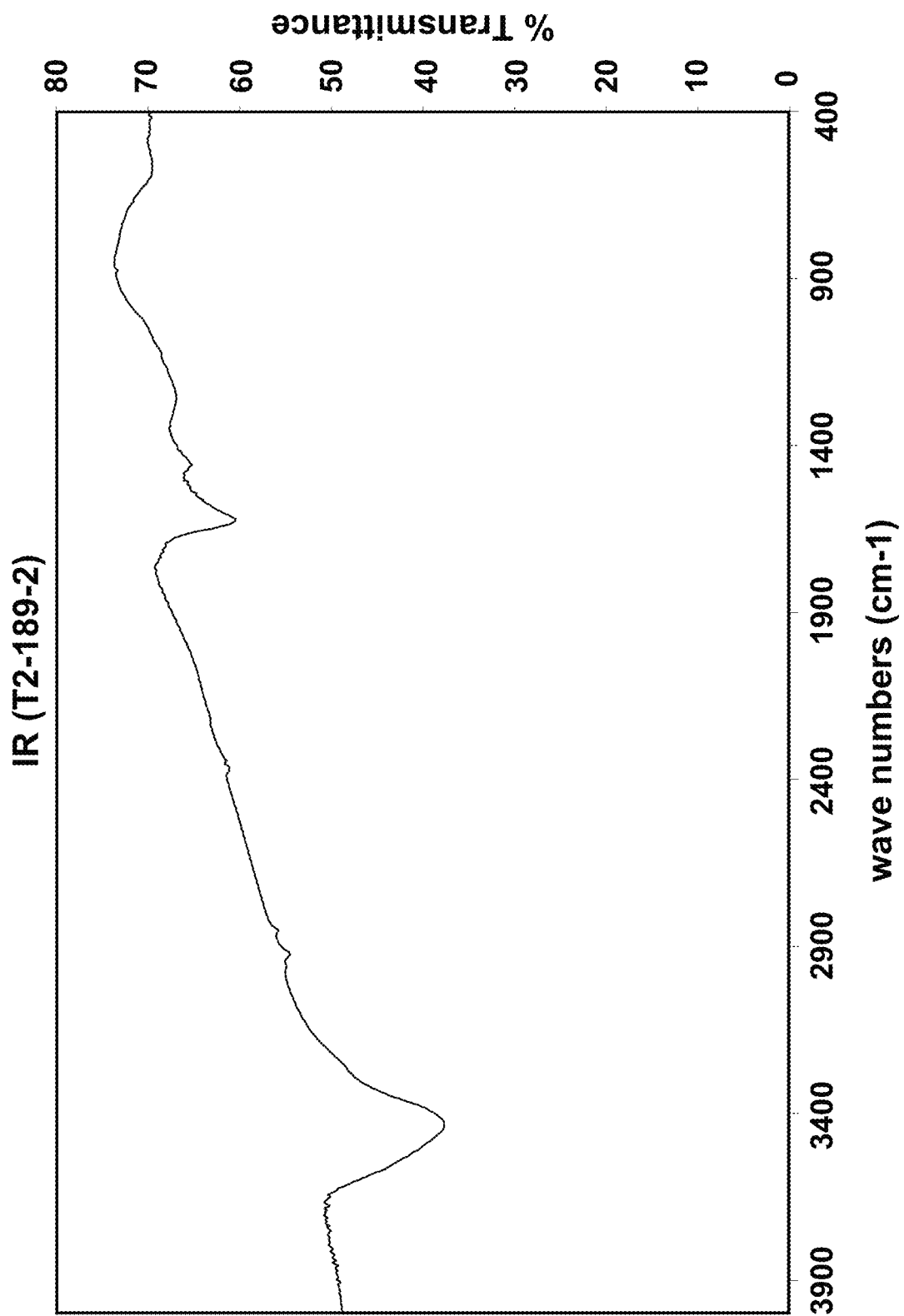
FIG. 1 shows an infrared spectrum of a doped carbon composite prepared in EXPERIMENT 1 according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, if any, the term "scanning electron microscope" or its abbreviation "SEM" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, if any, the term "X-ray photoelectron spectroscopy" or its abbreviation "XPS" refers to a method used to determine the composition of the top few nanometers of a surface. It involves irradiating a material with a beam of X-rays while simultaneously measuring the kinetic energy and number of electrons that escape from the top 1 to 10 nm of the material being analyzed.

As used herein, the terms "comprising," "including," "having," "containing," "involving," and the like are to be understood to be open-ended, i.e., to mean including but not limited to.

The description will be made as to the embodiments of the invention in conjunction with the accompanying drawings in FIGS. 1-11. In accordance with various embodiments of the invention, as embodied and broadly described herein, this disclosure, in one aspect, relates to doped carbon composites exhibiting unique properties and being different than any reported in the literature so far, and a synthesizing process of the same.

According to the invention, the synthesizing process is a novel improvement over U.S. Pat. No. 8,167,973, entitled "MICROWAVE-ASSISTED SYNTHESIS OF CARBON AND CARBON-METAL COMPOSITES FROM LIGNIN, TANNIN AND ASPHALT DERIVATIVES", U.S. patent application Ser. No. 12/487,323, entitled "MICROWAVE-ASSISTED SYNTHESIS OF CARBON AND CARBON-METAL COMPOSITES FROM LIGNIN, TANNIN AND ASPHALT DERIVATIVES AND APPLICATIONS OF SAME", and U.S. patent application Ser. No. 13/335,418, entitled "RENEWABLE RESOURCE-BASED METAL-CONTAINING MATERIALS AND APPLICATIONS OF THE SAME", which are incorporated herein by reference in their entireties.

According to various embodiments of the invention, doped carbon composites/materials are synthesized/made by adding heteroatom containing compounds to canon sources including tannin, lignin and derivatives, and pyrolyzing the mixture such that the carbon produced contains the heteroatom in the molecular structure in varying amounts depending on the ratio of the carbon to the heteroatom in the precursor. In one embodiment, the heteroatom includes nitrogen and phosphorus. However, other heteroatom can also be used to practice the invention.

The novel doped carbon compounds/materials contain nitrogen and carbon, as well as nitrogen, carbon and phosphorus. In one embodiment, the doped carbon composite is made by the carbonization of tannin in the presence of melamine. The process is modifiable by using different carbon sources such as urea, lignin, lignosulfonate, tannin sulfonate, phenol formaldehyde resins, melamine formaldehyde resins, tannin formaldehyde resins, resorcinol formaldehyde resins and urea formaldehyde resins. In addition, other renewable and non-renewable resource materials that contain carbon can also be used. Examples include sucrose, lactose, and glucose as renewable resource materials and polystyrene, naphthalenesulfonate as non-renewable resource based materials. Heteroatom containing compounds with oxygen (O), nitrogen (N), phosphorus (P), boron (B), sulfur (S), iodine (I), flourine (F), silicon (Si), selenium (Se), germanium (Ge) and mixtures thereof can be used to produce the appropriately doped carbon material. Furthermore, the process is carried out in an ambient atmosphere, i.e., the absence of any inert or reducing gases.

In one aspect of the invention, the synthesizing process of a doped carbon composite includes the steps of preparing a solution having a material containing tannin and an additive containing a doping chemical element; evaporating the solution to yield a plurality of powders; and subjecting the plurality of powders to a heat treatment for a duration of time effective to produce the doped carbon composite. In addition, the method may also include the step of adding polyphosphoric acid to the plurality of powders prior to the subjecting step.

The material containing the tannin can be tannin sulfonate, lignin, lignosulfonate, or a mixture thereof. The additive containing the doping chemical element can be one containing O, N, P, B, S, I, F, Si, Se, Ge, or a mixture thereof.

In one embodiment, the heat treatment is performed, for example, in an oven, a muffle furnace or the like, at a temperature in a range of about 700° C. to about 1800° C. The duration of time effective is in a range of about 10 minutes to about 2 hours.

In another embodiment, the heat treatment is performed by subjecting the plurality of powders to a microwave radiation, for example, with a frequency of 2.45 GHz at about 1.25 KW power and irradiated for about 30 minutes.

In another aspect of the invention, the doped carbon composite is synthesized by the pyrolysis of a mixture of tannin and melamine, where the steps involved in the synthesis process include dissolving the tannin and the melamine in water to form a homogeneous solution; evaporating the solution to yield a dry solid; and subjecting powders of the dry solid to a heat treatment between about 700° C. and about 1800° C. for about 10 minutes to about 2 hours. Additionally, the synthesis process further may also have the step of adding polyphosphoric acid to the plurality of powders prior to the subjecting step.

In yet another aspect of the invention, a synthesizing process of a doped carbon composite includes the steps of preparing a solution having a carbon source material and a heteroatom containing additive; evaporating the solution to yield a plurality of powders; and subjecting the plurality of powders to a heat treatment for a duration of time effective to produce the doped carbon composite.

In one embodiment, the carbon source material comprises tannin, urea, lignin, lignosulfonate, tannin sulfonate, phenol formaldehyde resins, melamine formaldehyde resins, tannin formaldehyde resins, resorcinol formaldehyde resins, urea formaldehyde resins, or a mixture thereof.

In one embodiment, the heteroatom containing additive comprises one containing or a mixture thereof.

In one embodiment, the heat treatment is performed at a temperature in a range of about 700° C. to about 1800° C. In one embodiment, the duration of time effective is in a range of about 10 minutes to about 2 hours.

In one embodiment, the heat treatment is performed by subjecting the plurality of powders to a microwave radiation with a frequency of 2.45 GHz.

In another embodiment, the heat treatment is performed by a heat source other than a microwave radiation source.

In yet a further aspect of the invention, a composite synthesized by the steps of preparing a solution having a carbon source material and a heteroatom containing additive; evaporating the solution to yield a plurality of powders; and subjecting the plurality of powders to a heat treatment for a duration of time effective to produce a doped carbon composite. In one embodiment, the synthesis process further includes the step of adding polyphosphoric acid to the plurality of powders prior to the subjecting step. In one embodiment, the method also includes the step of adding polyphosphoric acid to the plurality of powders prior to the subjecting step.

The carbon source material includes tannin, urea, lignin, lignosulfonate, tannin sulfonate, phenol formaldehyde resins, melamine formaldehyde resins, tannin formaldehyde resins, resorcinol formaldehyde resins, urea formaldehyde resins, or a mixture thereof.

The heteroatom containing additive includes a compound containing O, N, P, B, S, I, F, Si, Se, Ge, or a mixture thereof. Without intent to limit the scope of the invention, the following are examples of the heteroatom compound. The boron compound contains boric acid, or sodium borate. The phosphorus compound contains phosphoric acid, polyphosphoric acid, or sodium phosphate. The silicon compound contains potassium silicate. The fluorine compound contains ammonium fluoride. The iodine compound contains sodium iodide, or ammonium iodide. The nitrogen compound contains melamine, dicyandiamide, urea, guanidine, or histidine. Further, the additive may also have hexamine.

According to the invention, the doped carbon composite is useable for visible light degradation of organic molecules in water.

In one aspect of the invention, an article of manufacture is provided, where the article of manufacture is made according to the method set forth above. The article of manufacture is usable in a supercapacitor, a fuel cell, a photovoltaic cell, a lithium ion battery, an air filter, a water filter, or the likes.

The salient features associated with the process will be evident after the experiments described below.

Without intent to limit the scope of the invention, further exemplary processes and their related results according to the various embodiments of the invention are given below.

Experiment 1

Microwave Assisted Synthesis of Photoactive Phosphorus (P) and Nitrogen (N) Doped Carbon About 1.62 g of tannin and about 1.26 g of melamine were dissolved in about 50 mL of water with a few drops of methanol for added solubility, thereby, forming a mixture thereof. The mixture was heated until the solutes dissolved and the heating was continued until all the water evaporated from the evaporating dish. The resulting dry solid was scraped, which weighed about 2.45 g. Then, about 1 g of the powdered sample was placed in an alumina crucible with about 4 drops of phosphoric acid and covered with another boron nitride crucible and placed in a microwave oven operating at about 1.08 kW under ambient conditions for about 10 minutes. The sample was left for about 15 minutes to cool and a dark material was obtained and weighed (at about 0.438 g). The resulted material appeared dark green under an optical microscope and was electrically conductive when the leads of a multimeter were used to determine conductivity. Infrared spectrum of the phosphorus and nitrogen doped carbon obtained in this experiment is shown in FIG. 1.

Experiment 2

Synthesis of the Photoactive Phosphorus (P) and Nitrogen (N) Doped Material

Figure 2:
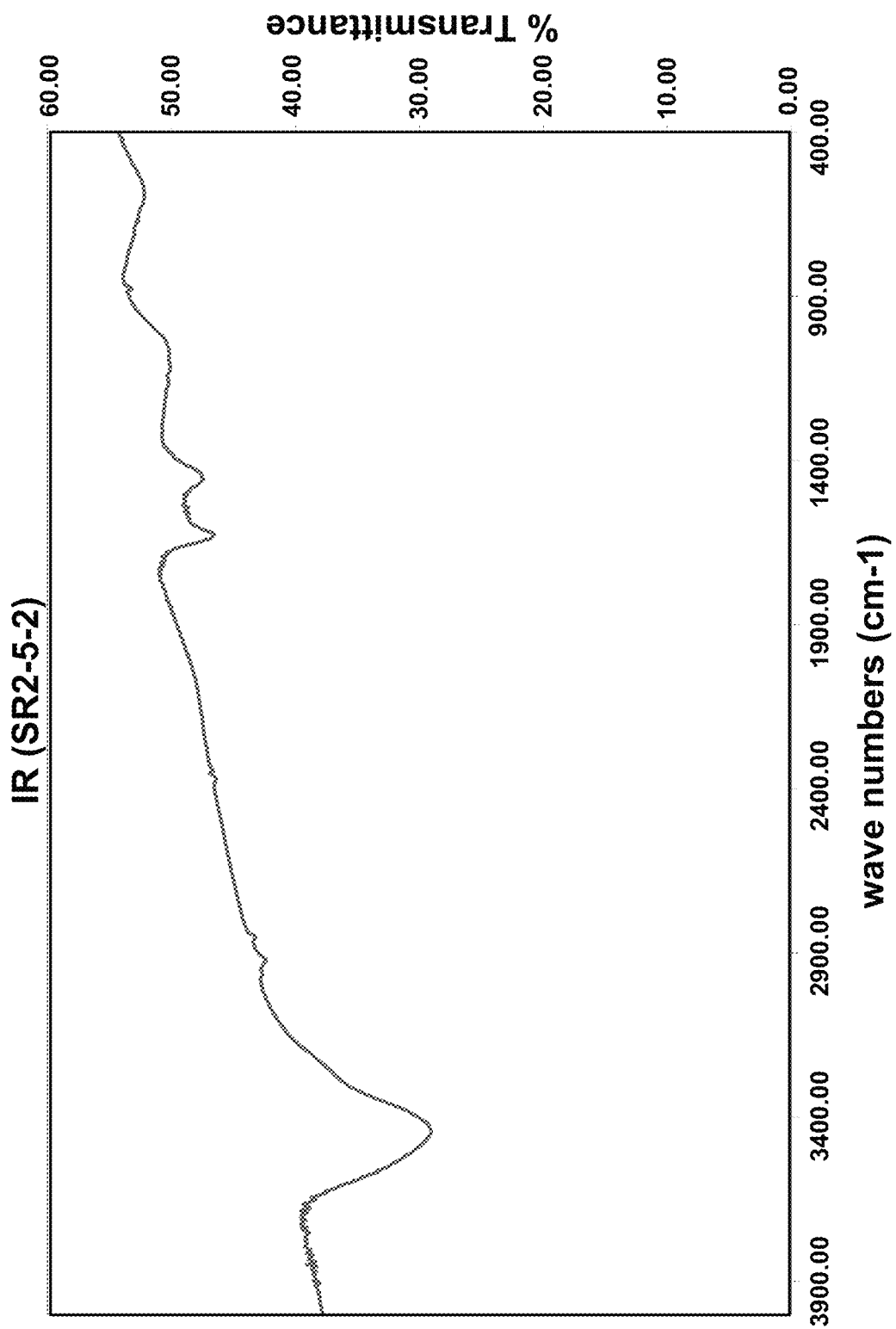
FIG. 2 shows an infrared spectrum of a doped carbon composite prepared in EXPERIMENT 2 according to one embodiment of the invention.

About 1.62 g of tannin and about 1.26 g of melamine were dissolved in about 50 mL of water with a few drops of methanol for added solubility, thereby, forming a mixture thereof. The mixture was heated until the solutes dissolved and the heating was continued until all the water evaporated from the evaporating dish. The resulting dry solid was scraped, which weighed about 2.45 g. The dry powdered sample was placed in an alumina crucible and covered with an alumina lid and placed in a muffle furnace at about 900° C. for about 2 hours under ambient conditions. Following the 2 hour period, the muffle furnace was turned off and the exhaust hole on the top was covered with a petri dish. Cooling was allowed to take place for several hours after which the furnace was opened and the dark material was obtained and weighed (at about 0.147 g). The obtained material appeared dark green under an optical microscope and was electrically conductive when the leads of a multimeter were used to determine conductivity. The infrared spectrum of the nitrogen doped carbon material has three prominent absorption bands, as shown in FIG. 2. The peak centered at about 3431 cm$^{-1}$ is indicative of O—H stretching. The peak at about 1620 cm$^{-1}$ is due to C=O stretch. Identity of another prominent peak at about 1445 cm$^{-1}$ has not been established yet. Some other less prominent peaks appear at about 1051 cm$^{-1}$, about 870 cm$^{-1}$ and about 565 cm$^{-1}$, respectively.

Experiment 3

Synthesis of Phosphorus (P) and Silicon (Si) Doped Carbon

An about 0.6 g sample of silicone oil (Pure Silicone Fluid, 500 cSt, from Clearco Products Co., Inc., Bensalem, Pa.) was mixed with about 0.62 g of polyphosphoric acid in a born nitride crucible to form a mixture. Further, about 2 g of tannin was added to the mixture and mixed well to make a slurry. The crucible was lightly covered with another boron nitride crucible and placed in an alumina foam box covered on all sides. This setup was placed in a microwave oven operating at about 2.45 GHz at about 1.25 KW power and irradiated for about 30 minutes. The crucible was taken out of the microwave oven after cooling for about an hour and a half. A highly conductive black material that weighed about 0.923 g was obtained.

Experiment 4

Degradation of Methylene Blue Dye (MB) by Visible Light

Visible light photocatalytic degradation of methylene blue dye (MB) in water using light from an overhead projector was demonstrated as follows:

An about 2 mg sample of MB obtained in EXPERIMENT 2 was dissolved in about 100 mL of water to form a mixture. About 50 mg of the nanomaterial above was added in the mixture and the stirred mixture was placed at a distance of about 8 cm from the lamp of an overhead projector that was lit using an about 360 W, 80 V halogen photooptic lamp. The blue color of the dye disappeared completely to the naked eye in about 40 minutes. Partial discoloration observed in the absence of light reappeared when methanol was added. Similar treatment with light treated material did not yield the color back.

After the initial color disappearance, another 2 mg of the dye was added and photo treatment was carried out. Complete dye degradation indicated by complete color loss was evident in about 40 minutes. Following this process, another 4 mg of MB was added and subjected to the same treatment as above. A similar observation was made after photo treatment for about 2 hours.

Experiment 5

Degradation of Methylene Blue Dye (MB) by Visible Light Using Microwave Made Material Visible light photocatalytic degradation of methylene blue dye (MB) in water by material made by the microwave method using light from an overhead projector was demonstrated as follows:

An about 1.0 mg sample of MB was dissolved in about 50 mL of water to form a mixture. Then, about 25 mg of the nanomaterial obtained in EXPERIMENT 3 was added in the mixture and the stirred mixture was placed in front of an overhead projector that was lit using an about 360 W 80 V halogen photooptic lamp. The blue color of the dye disappeared completely to the naked eye in about 10 minutes. Partial discoloration observed in the absence of light reappeared when methanol was added. Similar treatment with light treated material did not yield the blue color back.

Experiment 6

An about 4.32 g sample of tannin and about 1.89 g of melamine were dissolved in about 95 mL of hot water at a temperature close to about 100° C., to form a solution. Then about 0.69 g of hexamethylene tetramine (HMTA) dissolved in about 5 mL of water was added to the solution and continued to heat. Heating was continued until all the liquid evaporated, resulting in a dry solid material. The weight of the obtained dry solid material was about 5.95 g.

An about 1 g sample of the dry powdered material obtained from the above process was placed in a zirconia crucible and covered lightly with a small boron nitride crucible after the addition of about 3 drops of conc. nitric acid and about 2 drops of phosphoric acid. It was microwaved for about 30 minutes at about 1.2 kW power. The crucible was cooled and about 4 more drops of phosphoric acid were added, then capped and microwaved for about another 30 minutes. After cooling, about 0.32 g of a black material was obtained, which was conductive.

About 50 mg of this material was added to a stirred solution containing about 2.3 mg of methylene blue in about 40 mL water placed in the path of an about 360 W projector light. The blue color disappeared to the naked eye in about 25 minutes. Another 1.8 mg of MB added was decolorized in about 13 minutes. Further addition of about 1.4 mg of methyl violet was decolorized in about 11 minutes. Further addition of about 1.9 mg of methyl orange was decolorized in about 15 minutes.

Experiment 7

An about 4.32 g sample of tannin and about 1.89 g of melamine were dissolved in about 95 mL of hot water at a temperature close to 100° C. Then about 0.69 g of hexamethylene tetramine (HMTA) dissolved in about 5 mL of water was added to the solution and continued to heat. Heating was continued until all the liquid evaporated resulting in a dry solid material. The weight of the obtained dry solid obtained was about 5.95 g.

An about 1 g sample of the powdered material obtained from the above process was placed in a zirconia crucible and covered lightly with a small boron nitride crucible after the addition of about 2 drops of polyphosphoric acid. It was microwaved for about 30 minutes at about 1.2 kW power. After cooling, about 0.30 g of the black material was obtained, which was conductive.

About 50 mg of this material was added to a stirred solution containing about 1.5 mg of methylene blue in about 50 mL water placed in the path of an about 360 W projector light. The blue color disappeared to the naked eye in about 12 minutes. Another 4.2 mg of MB added was completely decolorized in about 25 minutes.

Figure 3:
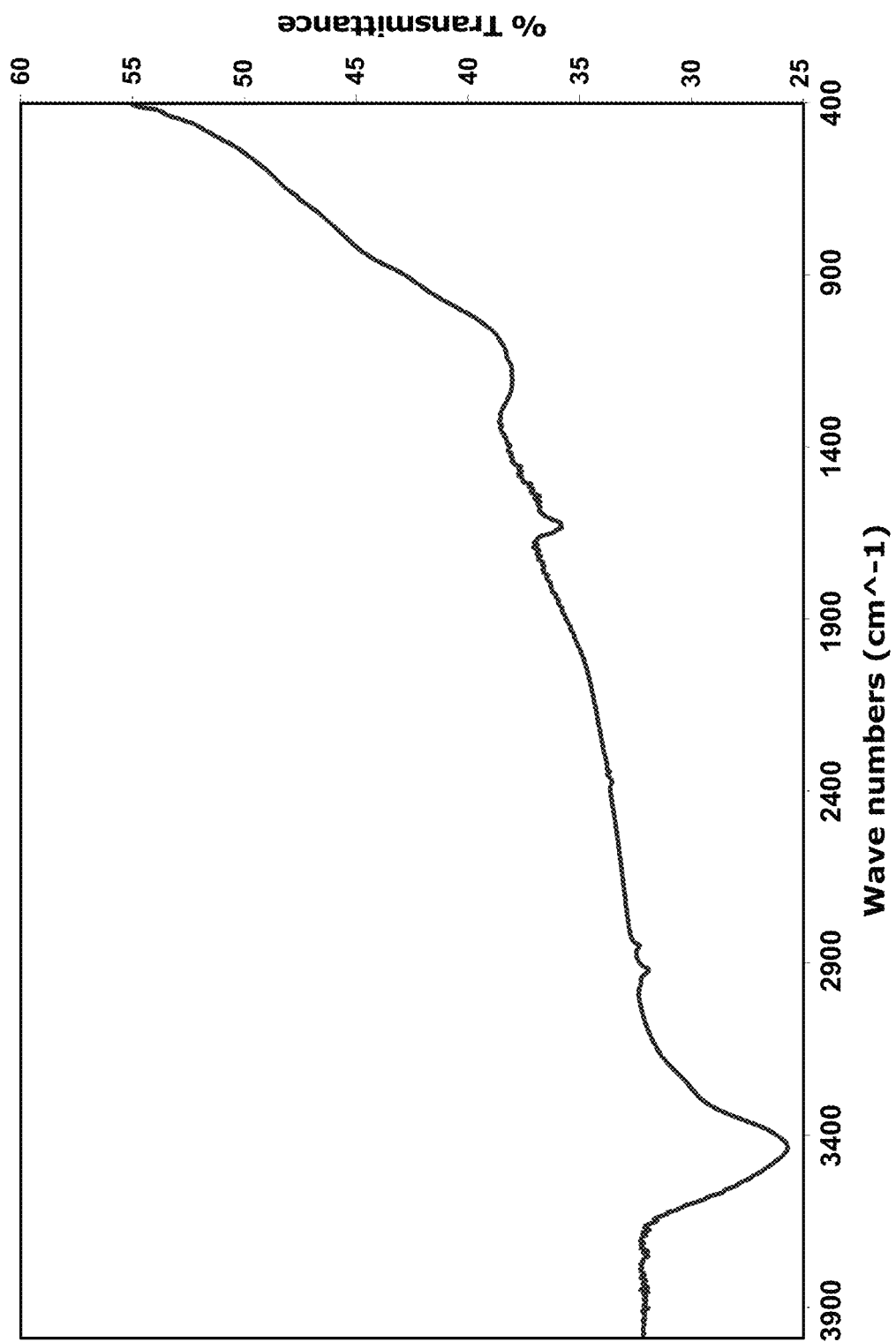
FIG. 3 shows a Fourier transform infrared spectrum (FTIR) of a doped carbon composite prepared in EXPERIMENT 7 according to one embodiment of the invention.

The Fourier transform Infrared spectrum (FTIR) of the phosphorus and nitrogen doped carbon material obtained in this experiment is shown in FIG. 3.

Further Characterization and Applications

Elemental compositions of the phosphorus and nitrogen doped carbon (PNDC) and hydrazine reduced PNDC compounds are listed in Table 1.

TABLE 1

Elemental composition of PNDC and reduced PNDC compounds.

| | Atomic % | | | |
|---|---|---|---|---|
| | Nitrogen (N1s) | Phosphorus (P2p) | Oxygen (O1s) | Carbon (C1s) |
| PNDC | 1.12 | 2.98 | 10.72 | 85.19 |
| Reduced PNDC | 0.95 | 0.00 | 5.73 | 93.08 |

Upon reduction with hydrazine, the oxygen content in the PNDC was reduced from about 10.72% to about 5.73% and phosphorus was completely removed, as shown in Table 1. The complete loss of phosphorus upon reduction is attributed to the formation of (soluble) ammonium phosphates that was washed away during filtration. The mechanism of this is however not quite clear.

Figure 4:
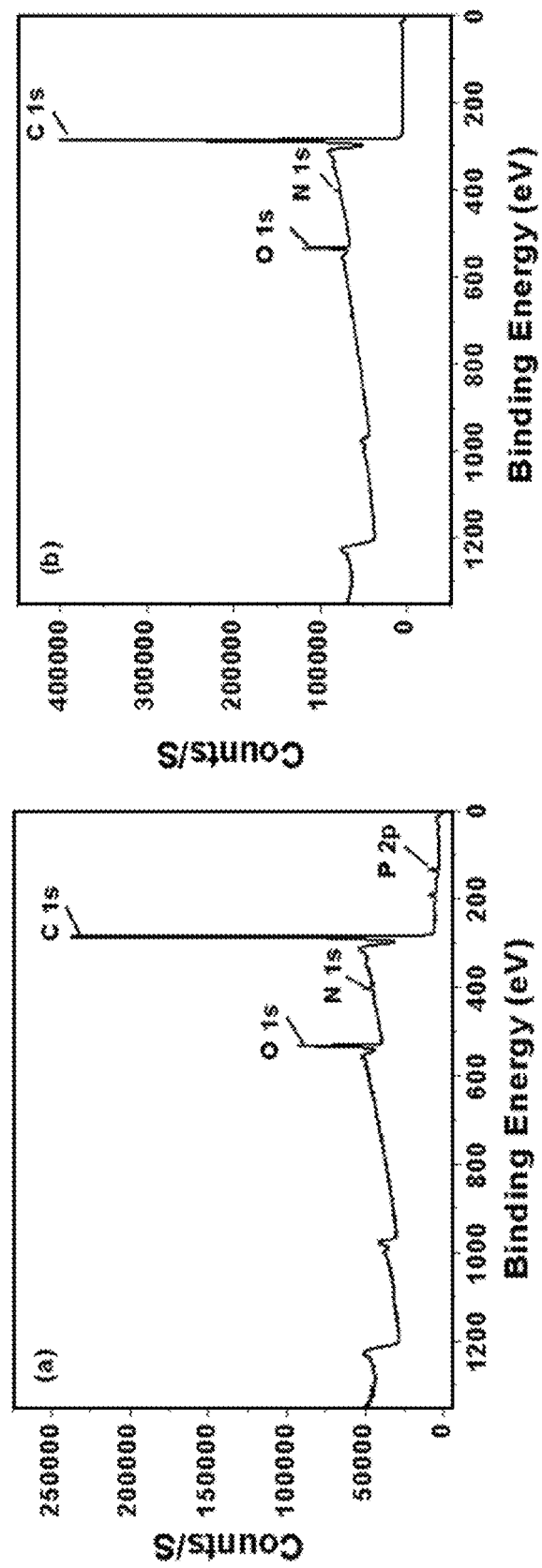
FIG. 4 shows survey scans of the PNDC and reduced PNDC according to one embodiment of the invention: (a) showing the presence of O1s, P2p, N1s and C1s elements in the PNDC, and (b) showing the presence of O1s, N1s and C1s elements in the reduced PNDC.

X-Ray Photoelectron Spectroscopy (XPS) Characterization: Doping of carbon by nitrogen and phosphorus established by the existence of N and P in the XPS survey scans, as shown in FIG. 4, where (a) the survey scan of PNDC shows the presence of O1s, P2p, N1s and C1s elements, and (b) the survey Scan of reduced PNDC shows the presence of O1s, N1 s and C1s elements.

The deconvoluted N1s spectrum of the PNDC shows the existence of five different nitrogen configurations, out of which the pyridinic (398.13 eV, 17.71 atomic %) and pyrrolic (400.49 eV, 61.77 atomic %) moieties are the most dominant. Nitrogen exists in five different binding energies, pyridinic (398.13 eV), pyrollic (400.49 eV), N-Oxide (403.59 eV), one low energy bond at 394.09 eV and high energy bond at 405.95 eV. Two different configurations for phosphorous are also identified from its deconvoluted P2p spectra, namely, P—O (132.94 eV) and a new high energy bond at 136.34 eV. The peak assignments for the low and high energy bonds for nitrogen and the high energy bond for phosphorous has not been identified so far. Carbon exhibits five different binding energies namely graphitic/$sp^2$ carbons (283.98 eV), carbonyl (285.58 eV), adventitious carbon (285.22 eV), C—N—C bond (289.24 eV) and N—C—O (292.98 eV). Deconvoluted O1s spectra show the existence of five different binding energies namely quinone (529.95 eV), carbonyl (531.79 eV), C—O (533.00 eV), C—OH (534.39 eV) and absorbed water (535.99 eV).

Figure 5:
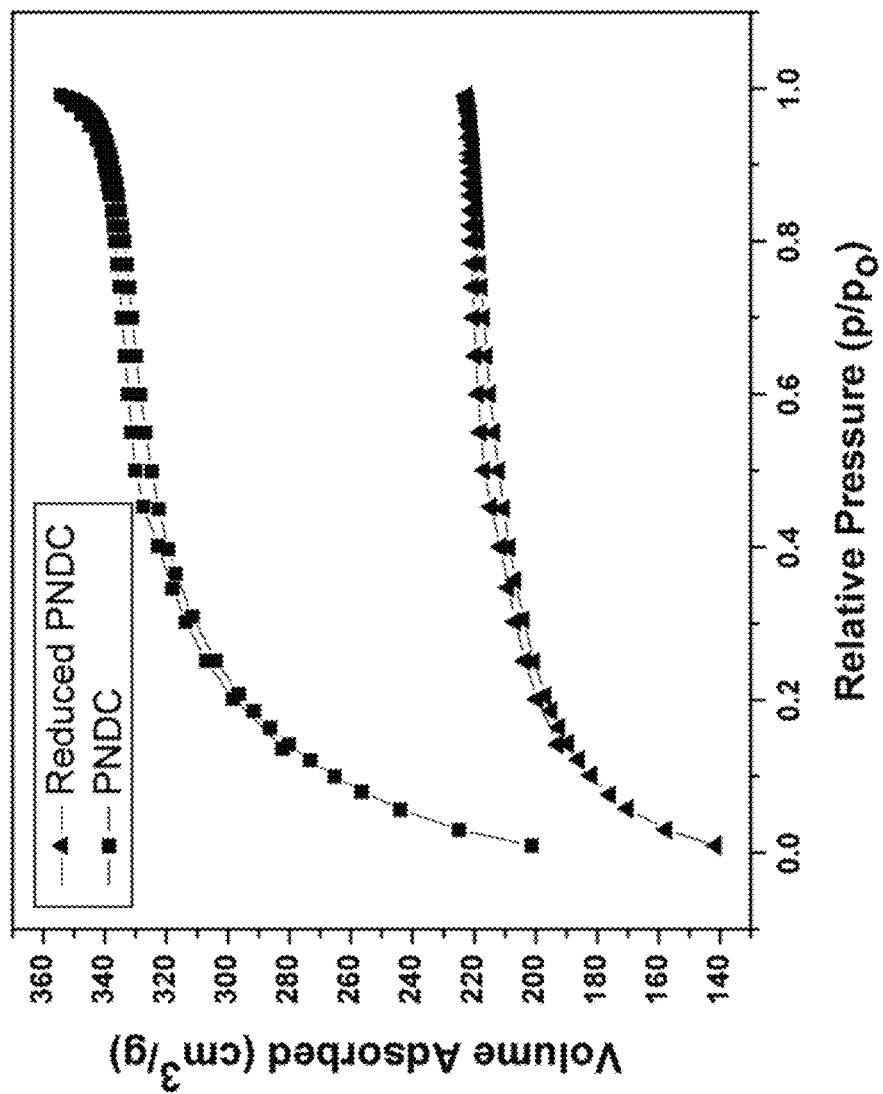
FIG. 5 shows nitrogen sorption linear isotherms of the PNDC and reduced PNDC composites according to one embodiment of the invention.

BET (Brunauer-Emmett-Teller) Surface Area Analysis: The PNDC and reduced PNDC have a microporous structure as the nitrogen adsorption isotherms. The BET surface area for the PNDC was about 1000 $m^2/g$ according to the BET method, while the reduced PNDC has a BET surface area of about 680 $m^2/g$. FIG. 5 shows nitrogen sorption linear isotherms of the PNDC and reduced PNDC composites.

Figure 6:
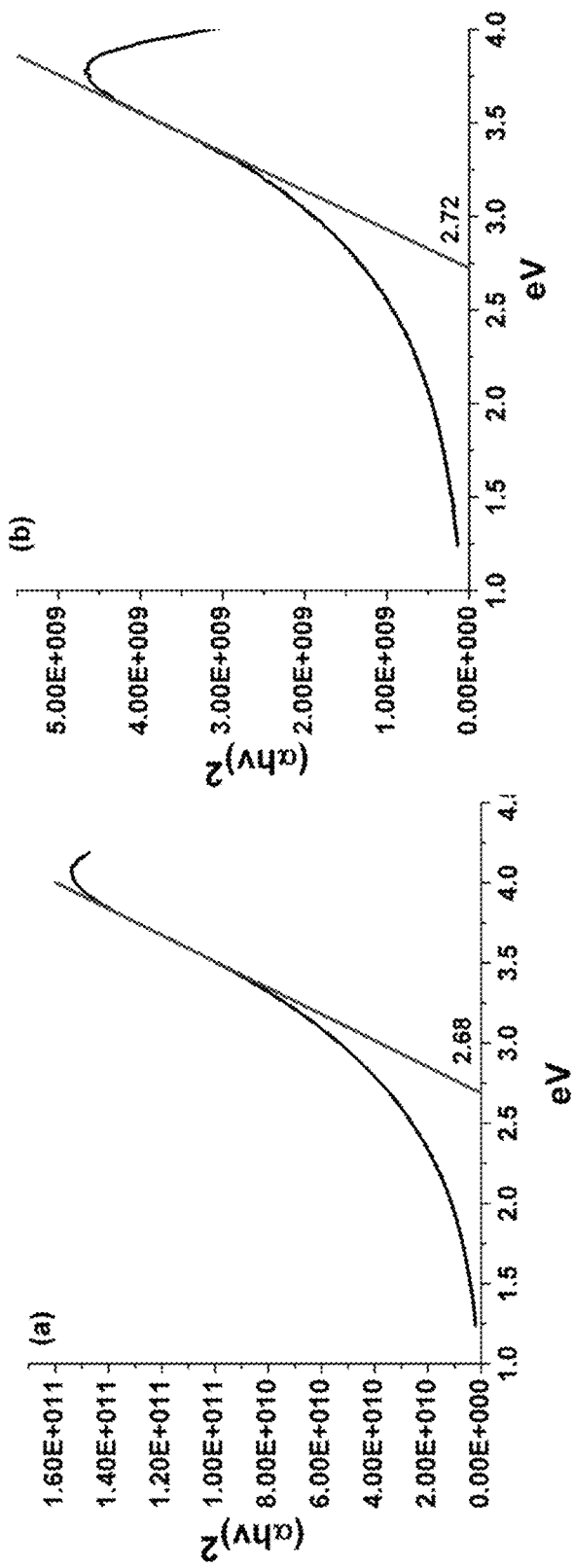
FIG. 6 shows Tauc plots of the PNDC and reduced PNDC according to one embodiment of the invention: (a) showing the direct band gap of the PNDC composite calculated using the absorption coefficient, and (b) showing the direct band gap of the hydrazine reduced PNDC.

UV-Visible Spectroscopy: Bandgaps of the PNDC and reduced PNDC are determined from the absorption coefficients values from the UV-Visible absorption spectra using Tauc equation. Plots of $(\alpha h\nu)^2$ vs eV are shown in FIG. 6, where (a) is the Tauc plot showing the direct band gap of the PNDC composite calculated using the absorption coefficient, and (b) is the Tauc plot showing the direct band gap of the hydrazine reduced PNDC.

Figure 7:
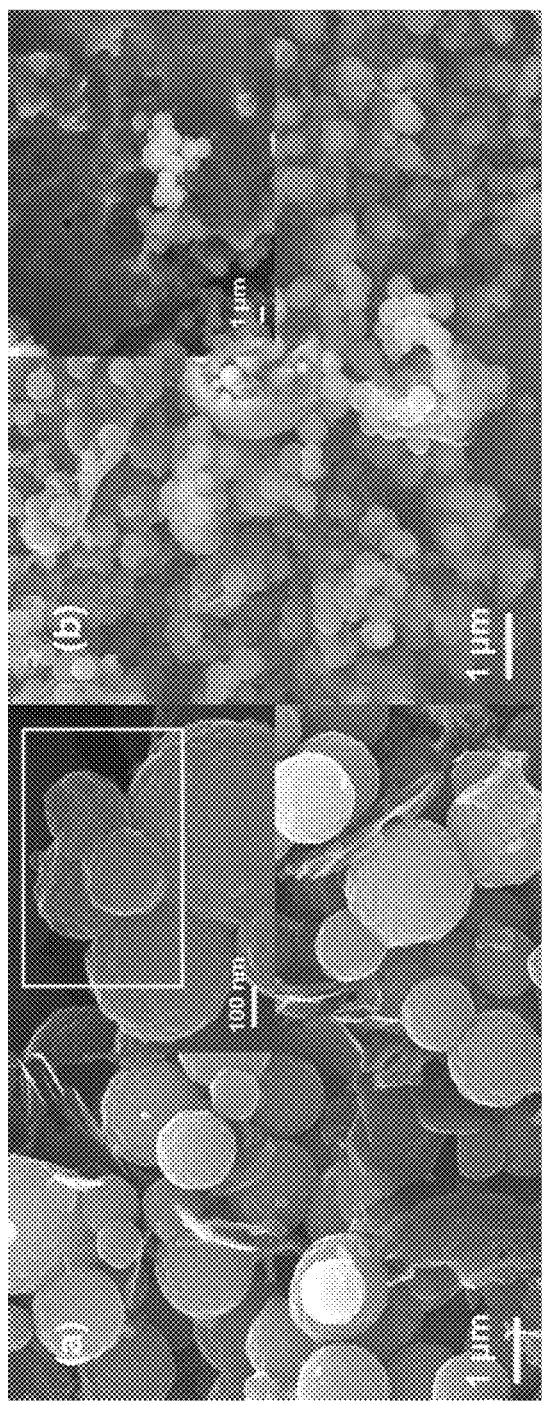
FIG. 7 shows SEM images of the PNDC and reduced PNDC according to one embodiment of the invention: (a) showing the spherical morphology of the PNDC along with the graphite like flakes, where inset shows the cross-section of some PNDC spheres, and (b) showing the formation of the PNDC spheres from tannin-melamine-hexamine polymer matrix after carbonizing for 10 minutes, where inset demonstrating the growth pattern of the spheres inside the polymer matrix.

Scanning Electron Microscope (SEM) Analysis: The synthesized PNDC has a dense spherical morphology ranging from about 0.5 μm to about 2.6 μm in diameter. A trivial amount of graphite-like planes/sheets are also observed. FIG. 7 shows (a) an SEM image showing the spherical morphology of the PNDC along with the graphite like flakes. Inset shows the cross-section of some PNDC spheres, and (b) an SEM image showing the formation of the PNDC spheres from tannin-melamine-hexamine polymer matrix after carbonizing for 10 minutes. Inset demonstrates the growth pattern of the spheres inside the polymer matrix.

Figure 8:
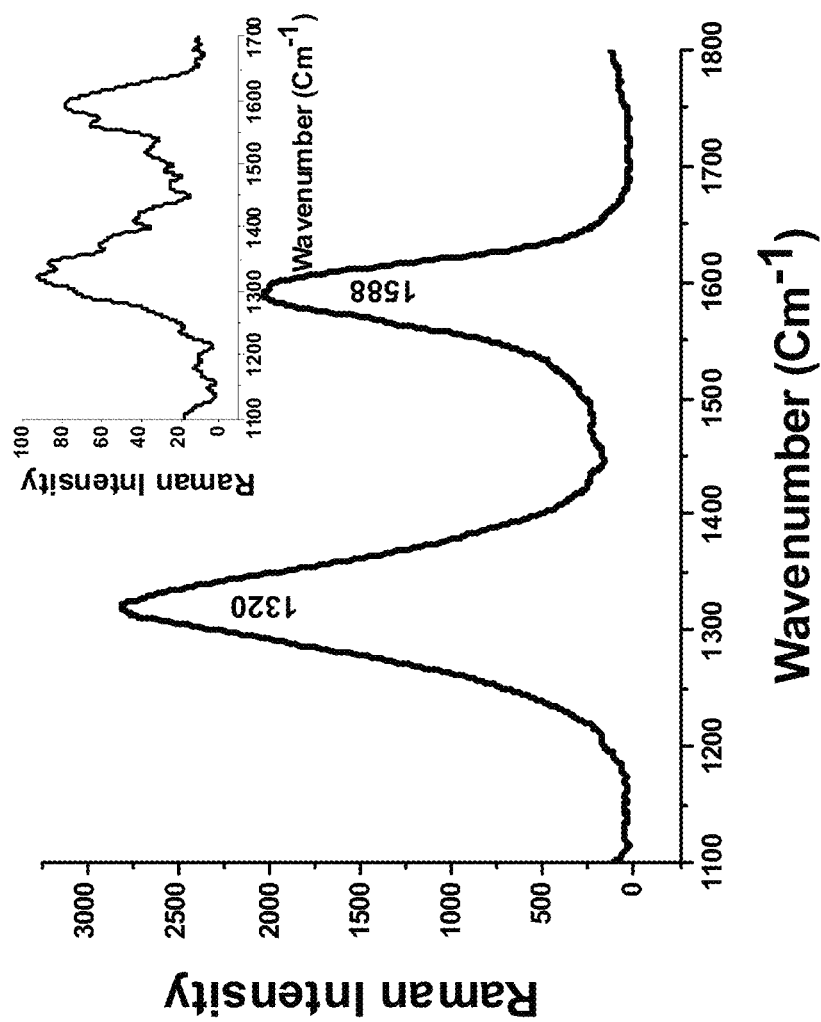
FIG. 8 shows Raman spectrum of the PNDC, showing D-band and G-band, where inset shows the Raman spectrum of the reduced PNDC according to one embodiment of the invention.

Raman Spectroscopy: The Raman spectrum of the PNDC exhibits two different bands at about 1320 $cm^{-1}$ and about 1588 $cm^{-1}$, which corresponds to the D-band and G-band of the $sp^2$ carbon atoms. The G-band is due to the specific vibrations of carbon atoms in the graphite crystal plane and D-band arises due to the defects in the graphite crystal plane, as shown in FIG. 8. The Raman spectrum of the reduced PNDC is shown in an inset of FIG. 8, where the $I_D/I_G$ value was found to be less than PNDC due to fewer defects and improved conjugation of $sp^2$ carbons atoms.

Figure 9:
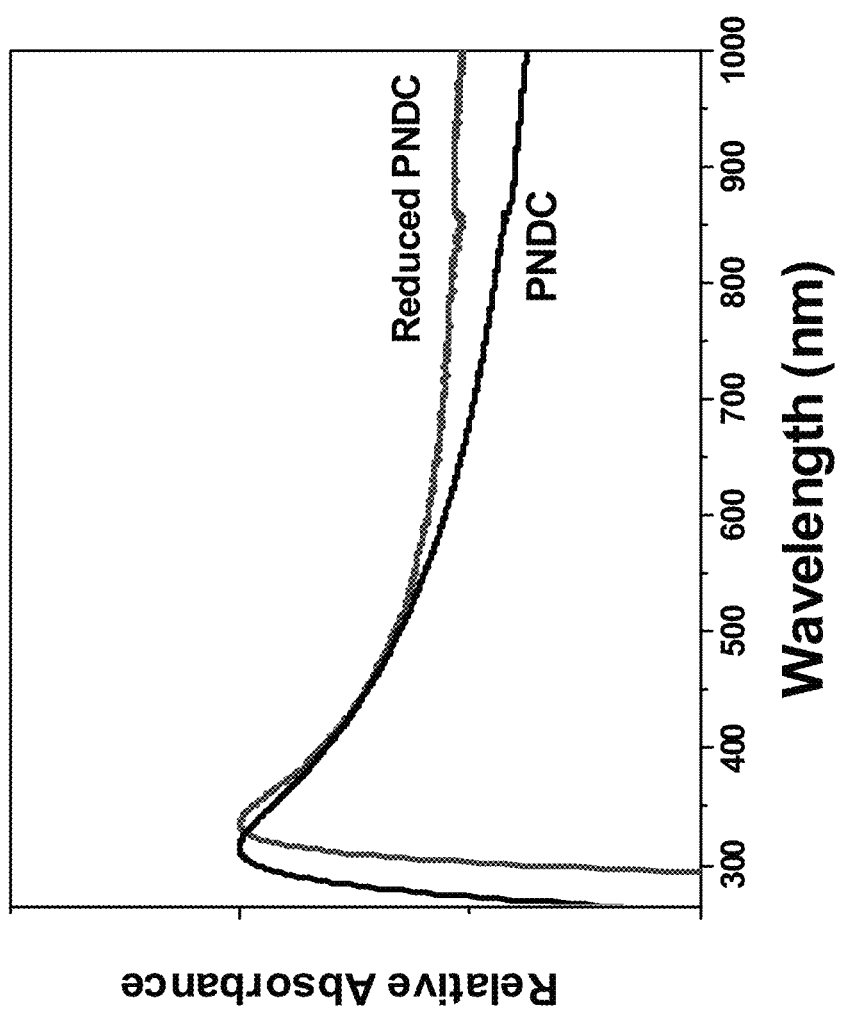
FIG. 9 shows UV-Visible absorption spectra of the PNDC and reduced PNDC according to one embodiment of the invention.

UV-Visible Spectroscopy: The PNDC shows broad range of absorption in the UV-Visible spectrum. The maximum absorbance was found to be about 314 nm, with the onset of absorption around about 600-700 nm, while the reduced PNDC exhibits a maximum about 333 nm, as shown in FIG. 9. This red shift upon reduction is attributed to the improved continuous carbon network upon reduction. Upon reduction the oxygen atoms involved in formation of carbonyl, epoxy and hydroxyl bonds are removed. Direct band gaps of the PNDC and reduced PNDC were found to be 2.68 eV and 2.72 eV respectively as analyzed by the Tauc equation.

Figure 10:
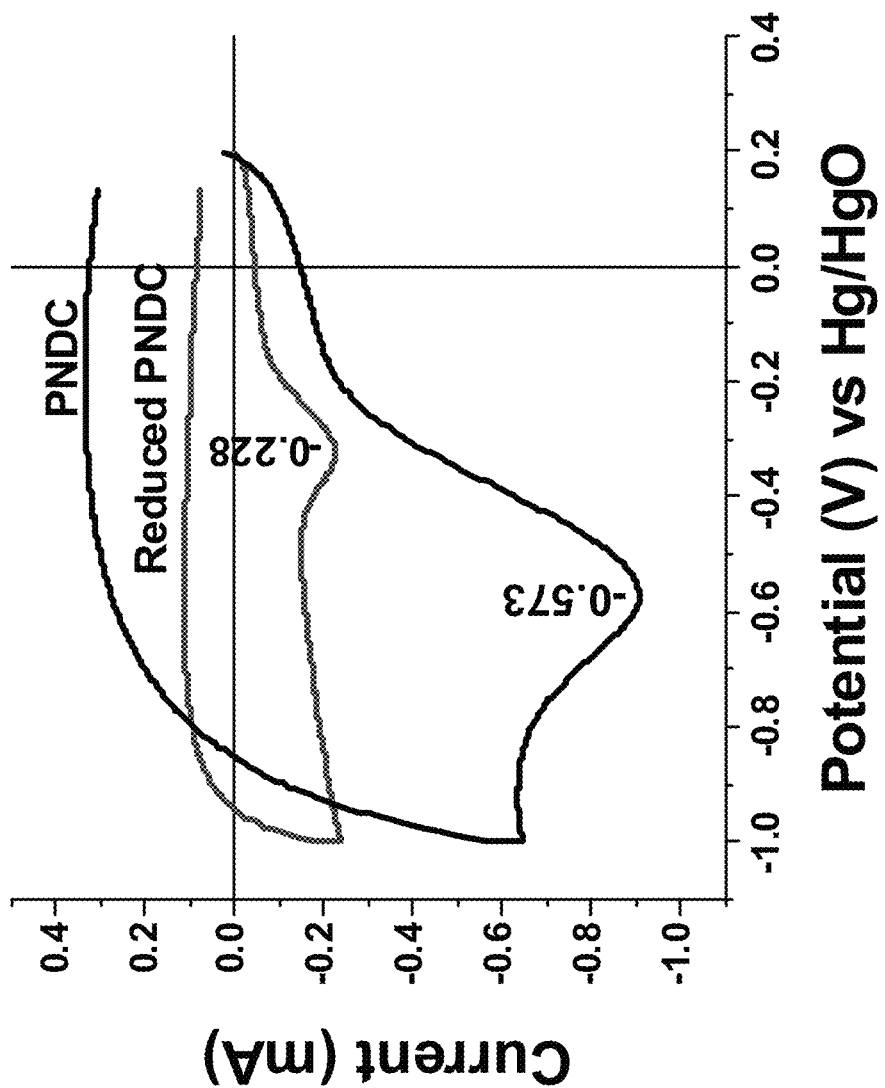
FIG. 10 shows cyclic voltammograms of the PNDC and reduced PNDC in oxygen saturated 0.1M KOH solution according to one embodiment of the invention.

Cyclic Voltammetry: Cyclic voltammograms of the PNDC and reduced PNDC in oxygen saturated, 0.1 M KOH are shown in FIG. 10. The oxygen reduction reaction (ORR) potential of the PNDC was found to be at about −0.57 V, with an onset potential of −0.23 V. However, in the case of the reduced PNDC, the ORR potential was found to be at about −0.23 V, with an onset potential at about 0.18 V. Upon reduction of the PNDC, ORR potential shifted towards the positive side. The reduction potential of reduced PNDC is found more towards the positive voltages when compared to other heteroatom doped carbon materials synthesized by different methods. This material is very promising for ORR applications due to the presence of relatively high amounts of pyridinic and pyrrolic nitrogens.

Figure 11:
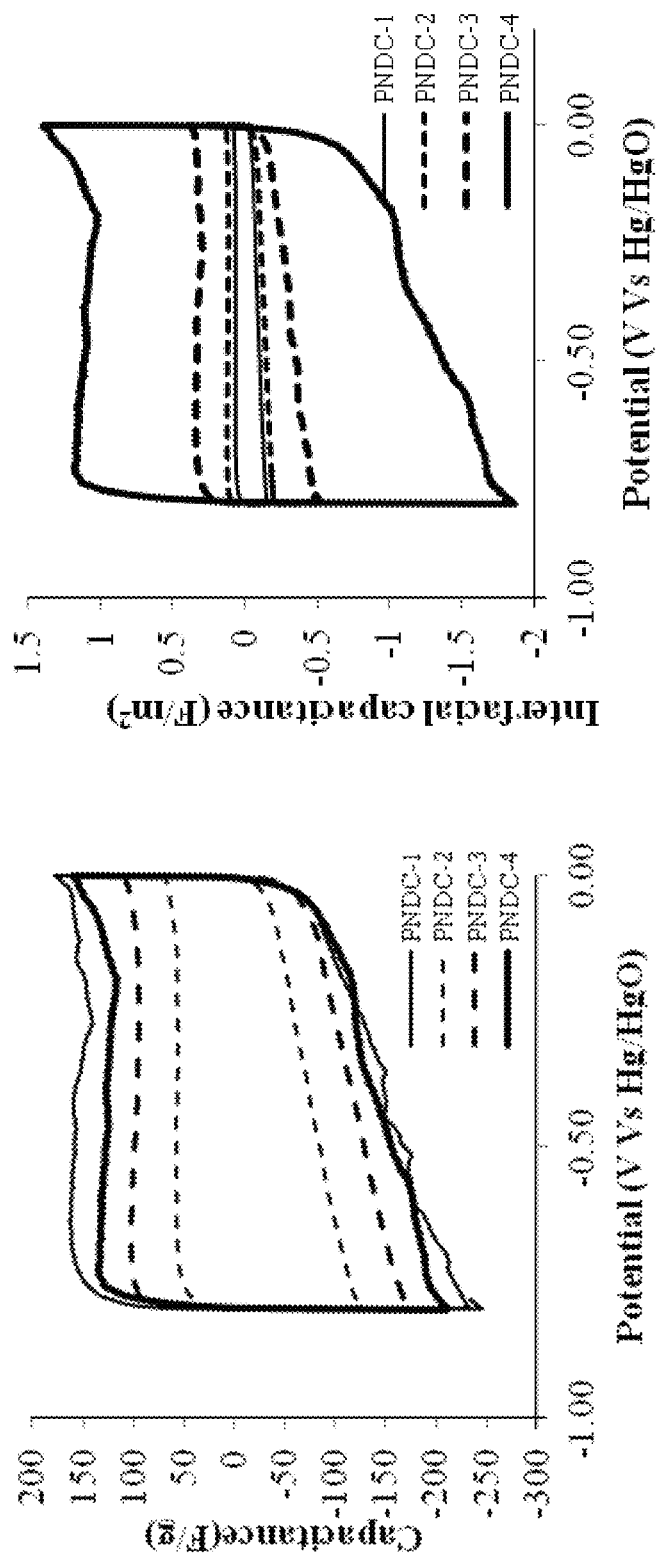
FIG. 11 shows cyclic voltammetry plots of PNDCs in 6.0 M KOH electrolyte recorded (a) at 5 mV, showing the capacitance, and (b) the interfacial capacitance according to one embodiment of the invention.

Supercapacitance: Supercapacitance evaluation was carried out electrochemically using three electrode systems similar to the ORR evaluation (cyclic voltammogram, as shown in FIG. 11). Capacitance of the composites followed linearity based on amount of nitrogen doping as well as surface area. Interfacial capacitance was calculated based on their BET specific surface area and increased nitrogen content lowered the specific surface area (about 113 $m^2/g$) due to loss of micropores showing higher interfacial capacitance, as shown in FIG. 11(b). The optimum nitrogen doping resulted in high surface area (about 479-855 $m^2/g$) with ideal interfacial capacitance. The highest interfacial capacitance of about 1.8 $F/m^2$ was observed with PNDC-4 at potential of about −0.78 V vs. Hg/HgO (cathodic branch) which is very high and comparable to the best literature values. The cyclic voltammetry plots of the PNDCs in 6.0 M KOH electrolyte are shown in FIG. 11: (a) at 5 mV, showing the capacitance, and (b) the interfacial capacitance.

Thus, the photoactive doped carbons with efficient ORR and high capacitance show excellent potential of these renewable resource-based nanostructured materials in photo/electrochemical energy devices, and could play a significant role in next generation energy devices.

In sum, the invention, among other things, recites a synthesis process of novel materials, termed as doped carbon, which exhibits many unique spectral properties that are different than any reported in the literature so far. The synthesis process has at least the following advantages over the conventional process: (a) including renewable resource materials as carbon source, (b) being cheap, as it uses inexpensive and readily available ingredients, (c) being quick, (d) being reproducible, and (e) not using any gases from an outside source during the synthesis.

According to the invention, novel materials are made containing nitrogen and carbon as well as nitrogen, carbon and phosphorus. In one embodiment, the materials are made by the carbonization of tannin in the presence of melamine. The process can be modified by using different carbon sources such as urea, lignin, lignosulfonate, tannin sulfonate, phenol formaldehyde resins, melamine formaldehyde resins, tannin formaldehyde resins, resorcinol formaldehyde resins and urea formaldehyde resins. In addition, other renewable and non-renewable resource materials that contain carbon may be used. Examples include sucrose, lactose, and glucose as renewable resource materials and polystyrene, naphthalenesulfonate as non-renewable resource based materials. Heteroatom containing compounds with sulfur, nitrogen, phosphorus, boron, iodine, fluorine, silicon, germanium and mixtures thereof can be used to produce the appropriately doped carbon materials.

Doped carbon unlike pure carbon can impart desirable properties such as increased conductivity, thermal stability and interesting optical properties which can be beneficial in applications such as traditional catalysis and photocatalysis including photocatalytic degradation of organic molecules in water as well as air. They can be useful in photocatalytic splitting of water to produce hydrogen and oxygen under the right conditions. They can also be useful in fuel cells, supercapacitors as well as in lithium batteries. Specifically, the materials produced by various embodiments of this invention can find applications, but not limited, in the following, areas:

1. Enhanced decomposition of organic molecules (including fats, oils, polychlorinated biphenyls, explosives, dyes and organic toxic runoffs) due to the large surface area and appropriate bandgap of the novel materials.
2. Use the novel materials as anti-bacterial, anti-virus and anti-fungal applications useful in the food and bio-medical industries.
3. Air purification systems to kill microbes, volatile organic compounds, formaldehyde, ammonia, cigarette fumes, automobile and industrial exhausts.
4. Water purification systems.
5. Destruction of chemical warfare agents.
6. Hydrogen production by splitting water and use in fuel cells.
7. Self-cleaning surfaces including odor absorbing and odor destroying properties.
8. Destruction of ethylene gas for prolonging the life of fruits.
9. Photovoltaic applications.
10. Supercapacitors and batteries including Li batteries.

Many more applications can be found in various areas as well.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the invention pertains without departing from its spirit and scope. For example, multiple probes may be utilized at the same time to practice the invention. Accordingly, the scope of the invention is defined by the appended claims as well as the foregoing description and the exemplary embodiments described therein.

REFERENCE LIST

[1] Non-covalent doping of graphitic carbon nitride with graphene: controlled electronic structure and enhanced optoelectronic conversion by Y. Zhang, T. Mori, L. Niu and J. Ye, Energy Environ. Sci. 2011, 4, 4517.
[2] Carbon nitride preparation method, Mamakhel et al US 2010/0015030A1, Jan. 21, 2010.
[3] Preparation of high nitrogen compound and materials therefrom, Huynh et al, U.S. Pat. No. 7,119,179 B1, Oct. 10, 2006.

What is claimed is:

1. A composite synthesized by the steps of:
   (a) preparing a solution having a carbon source material and a non-metallic heteroatom containing additive containing a doping chemical element, wherein the carbon source material comprises tannin, urea, lignin, lignosulfonate, tannin sulfonate, phenol formaldehyde resins, melamine formaldehyde resins, tannin formaldehyde resins, urea formaldehyde resins, or a mixture thereof;
   (b) evaporating the solution to yield a plurality of powders; and
   (c) subjecting the plurality of powders to a heat treatment for a duration of time effective to produce a doped carbon composite,
      wherein no metal source material is used in the steps, such that the doped carbon composite does not contain metal component;
      wherein the non-metallic heteroatom containing additive comprises oxygen (O), nitrogen (N), phosphorus (P), sulfur (S), iodine (I), fluorine (F), mixture thereof; and
   wherein the non-metallic heteroatom containing additive further comprises a boron compound containing boric acid.

2. The composite of claim 1, wherein the synthesis process further comprises the step of adding polyphosphoric acid to the plurality of powders prior to the subjecting step.

3. The composite of claim 1, being usable for a supercapacitor, a fuel cell, photovoltaic cell, a lithium ion battery, an air filter, or a water filter.

4. An article of manufacture, comprising the composite of claim 1.

5. The article of manufacture of claim 4, being a supercapacitor, a fuel cell, photovoltaic cell, a lithium ion battery, an air filter, or a water filter.

6. A composite synthesized by the steps of:
   (a) preparing a solution having a carbon source material and a non-metallic heteroatom containing additive containing a doping chemical element, wherein the carbon source material comprises tannin, urea, lignin, lignosulfonate, tannin sulfonate, phenol formaldehyde resins, melamine formaldehyde resins, tannin formaldehyde resins, urea formaldehyde resins, or a mixture thereof;
   (b) evaporating the solution to yield a plurality of powders; and (c) subjecting the plurality of powders to a heat treatment for a duration of time effective to produce a doped carbon composite, wherein no metal source material is used in the steps, such that the doped carbon composite does not contain metal component;

wherein the non-metallic heteroatom containing additive comprises oxygen (O), phosphorus (P), boron (B), sulfur (S), iodine (I), fluorine (F), a nitrogen compound containing melamine, dicyandiamide, urea, guanidine, or histidine, or a mixture thereof; and wherein the non-metallic heteroatom containing additive further comprises hexamine.

7. The composite of claim 6 useable for visible light degradation of organic molecules in water.

* * * * *